United States Patent [19]

Akamatsu

[11] Patent Number: 5,257,355
[45] Date of Patent: Oct. 26, 1993

[54] METHOD AND APPARATUS FOR GENERATING NON-LINEARLY INTERPOLATED DATA IN A DATA STREAM

[75] Inventor: Norio Akamatsu, Tokushima, Japan

[73] Assignee: Just Systems Corporation, Tokushima, Japan

[21] Appl. No.: 885,238

[22] Filed: May 20, 1992

Related U.S. Application Data

[63] Continuation of Ser. No. 371,673, Jun. 23, 1989, abandoned, which is a continuation of Ser. No. 102,637, Sep. 30, 1987.

[30] Foreign Application Priority Data

Oct. 1, 1986 [JP] Japan ............................. 61-235084

[51] Int. Cl.$^5$ ............................................. G06F 15/62
[52] U.S. Cl. ................................ 395/142; 364/723
[58] Field of Search .............. 364/518, 514, 723, 169, 364/853, 167.01; 395/142; 340/728

[56] References Cited

U.S. PATENT DOCUMENTS

| | | | |
|---|---|---|---|
| 3,633,017 | 1/1972 | Crooke et al. | 364/721 |
| 3,943,343 | 3/1976 | Irie | 364/723 |
| 4,384,286 | 5/1983 | Ditoro | 395/142 X |
| 4,446,529 | 5/1984 | Strolle | 364/723 |
| 4,528,639 | 7/1985 | Edwards | 364/723 |
| 4,757,465 | 7/1988 | Hakoopian et al. | 364/723 |
| 4,825,398 | 4/1989 | Koch et al. | 364/724.01 |

FOREIGN PATENT DOCUMENTS 1358071  6/1974  United Kingdom ............... 395/142

OTHER PUBLICATIONS

A. Savitzky and M. J. E. Golay, "Smoothing and Differentiation of Data by Simplified Least Squares Procedures," Anal. Chem., vol. 36, No. 8, pp. 162701639, (Jul. 1964).

J. Steiner, Y. Termonia, and J. Deltour, "Comments on Smoothing and Differentiation of Data by Simplified Least Square Procedure," Anal. Chem., vol. 44, No. 11, pp. 1906–1909, (Sep. 1972).

*Primary Examiner*—Mark K. Zimmerman
*Attorney, Agent, or Firm*—Wenderoth, Lind & Ponack

[57] ABSTRACT

A method and apparatus generates non-linearly interpolated point data of a graphic display. At least four graphic point data are retained in a memory and are arithmetically processed to generate an interstitial point data between an interval of the graphic point data. The interstitial point is generated by adding the N-bit-shifted difference of a first and second point data and the N-bit shifted difference of a fourth and third point data and the one-bit-shifted summation of the second and third point data.

4 Claims, 5 Drawing Sheets

F I G. 3
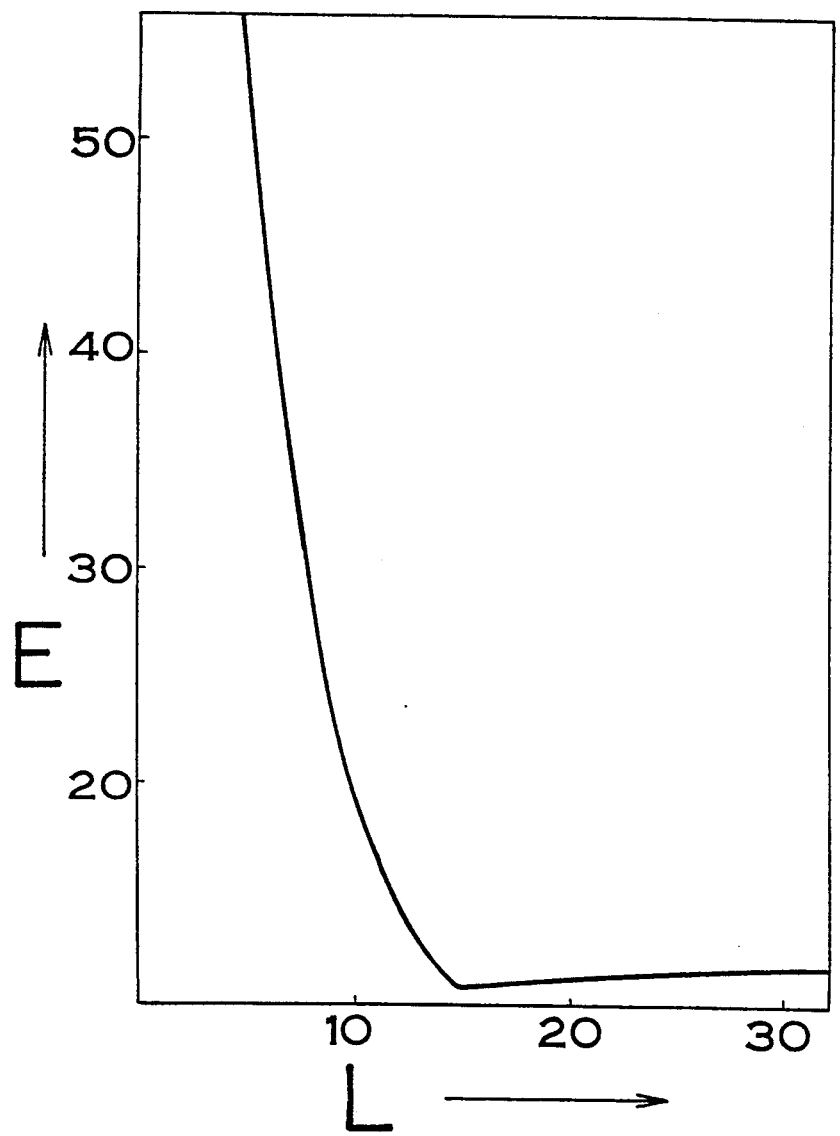

METHOD AND APPARATUS FOR GENERATING NON-LINEARLY INTERPOLATED DATA IN A DATA STREAM

This application is a continuation of now abandoned application, Ser. No. 07/371,673, filed Jun. 23, 1989, which is a continuation of abandoned application Ser. No. 07/102,637, filed Sep. 30, 1987.

BACKGROUND OF THE INVENTION

The present relates invention primarily to methods and apparatus for a graphic display to insure a visually natural image by joining intermediate points between four or more given points. The intermediate points between four or more given points are necessary to produce smooth curves. For example, when ordered points such as A, B, C, D, E, F, G, H, . . . are known, the present invention can be used to produce smooth curves by joining intermediate points, between those points and, furthermore, intermediate points of the intermediate points.

In computer graphics systems, mathematical conditions for continuity are important, but the most critical task is to obtain data which appears natural when presented in terms of discrete pixels. Interpolation methods did not always play an important role in computer graphics, and were originally used as a supplementary tool to obtain finer resolution. Consequently, former indirect interpolation methods such as those that fit orthogonal functions to the given data, and then obtained interpolation values from those functions, were clearly not optimum methods. Curves generated using polynomial or Fourier series interpolation methods sometimes appear unnatural as a result of oscillations occurring at bend points. The spline function method was developed to overcome this problem, but spline functions also produce overshoot for certain data. As a further improvement Ackland has proposed the osculatory interpolation method, but it also generates some small oscillations as well as requiring excessive computation time. Akima has reported the development of an interpolation method which produces naturally appearing results with negligible oscillations by local area determination of polynomial coefficients. However, Akima's method requires the use of floating point arithmetic, and therefore computation is slow. The graphics method of the present invention considers only those given data points in the area of the point to be evaluated, and omits information from given data points which have little effect in that area. This local area approach results in interpolated values which have little oscillation error. In applying the graphics method of the present invention to various given graphics data, it has been found that the interpolation error increases rapidly as the reciprocal of the weighted coefficient L is reduced below a value of 10, but decreases between 10 and 20 giving exceptionally accurate results. Suitable selection of the weighted coefficient results in an extremely simple interpolation algorithm which has enormous practical value in computer graphics applications.

Former approaches to graphic data interpolation are detailed in the following.

A curve lying in the XY plane can be expressed parametrically as $X=F(m)$ and $Y=G(m)$, where m is the parameter. Likewise, a surface in three space (XYZ coordinates) can be expressed parametrically as $X=F(m)$, $Y=G(m)$, and $Z=H(m)$, where again m is the parameter. Now let $[X_i, g(X_i)]$, $(i=1, 2, \ldots, n)$ be an array of points formed by an ordered arrangement of discrete data from some measurement or from computation within the computer. Using parametric expression, any arbitrary point array can be converted to a collection of single valued point arrays. Therefore, $[X_i, g(X_i)]$ can be assumed to be single valued without any loss of generality. Here, each $g(X_i)$ corresponds to the given data at each $X_i$. Let the interval $delta_i=[X_i, X_{i+1}]$, $(i=1, 2, \ldots n-1)$ be designated the interpolation interval, and let $P_i$ be an arbitrary point within the interpolation interval $delta_i$. When the data points $g(X_i)$, $(i=1, 2, \ldots, n)$ are known, the determination of the unknown value $f(P_i)$, corresponding to the point $P_i$, is called interpolation or curve fitting.

Methods which determine interpolated values are categorized as either direct or indirect interpolation methods. In direct interpolation, such as in the method of this invention, interpolated values are directly determined from given data points in the vicinity of the point to be evaluated. Since directly interpolated values are computed from local data, irrespective of global conditions, calculations can be performed in parallel.

In formerly employed indirect interpolation, interpolated values are determined in two steps. First, coefficients are determined for a polynomial curve which passes through the given data points. Next, interpolated values are determined at interpolation point locations substituted into the previously determined polynomial function. Since local determination of polynomial coefficients is very difficult, indirect interpolation is not suitable for parallel computation.

In indirect interpolation, m parameters $Q_i$ $(i=1, 2, \ldots, m)$ are determined from the given data $g(X_i)$, $(i=1, 2, \ldots, n)$. Here $q_i$ are the coefficients of the interpolation function.

$$Q_1(q_1, \ldots, q_m) = 0$$
$$Q_2(q_1, \ldots, q_m) = 0$$
$$\vdots$$
$$Q_n(q_1, \ldots, q_m) = 0$$

Hence, it is necessary to solve n equations for m variables. Indirect interpolation includes methods such as the Lagrange interpolation method and the spline function method. In the Lagrange method, $m=n$, and all the unknowns are completely determined, but in the spline function method employing third order polynomials (cubic splines), $m=n+2$. In this case, since the number of unknowns exceeds the number of equations, the m parameters $q_i (i=1, 2, \ldots, m)$ are determined by introducing two boundary conditions, such as the "natural cubic spline" conditions. The interpolation function T is thus determined once the coefficients $(q_1, q_2, \ldots, q_m)$ are known. The interpolated value at the point $P_i$ is then solved by substituting the coordinates of $P_i$ into the function T.

$$f(P_i) = T(P_i; q_1, q_2, \ldots, q_m)$$

Indirect interpolation methods have the following shortcomings. As the number of unknowns m increases, the number of computations required to solve the equations containing these unknowns increases as the square of m. This requires excessive computation time and reduces overall processing efficiency. Further, because of memory usage considerations, certain programs, such as some CAD programs, place restrictions on the number of data points which can be handled. Still further, since floating point arithmetic is used to solve indirect interpolation equations, additional processing time is required, and the effects of rounding error must be considered.

Since the m parameters $q_i$ (i=1, 2, ..., m) are determined based on data over the entire region to be interpolated, indirect interpolation values are effected by distant data points. Consequently, unnatural oscillations or wiggles develop when indirect methods are applied to regions which contain rapidly varying data. These oscillations are called the "Runge phenomenon" for the Lagrange interpolation method, and the "Gibbs phenomenon" for indirect interpolation employing Fourier series. In the spline function interpolation method, polynomial coefficients are determined for each interpolation interval within the interpolation region, thereby reducing the effects of distant data points on the interpolated value. However, in the spline function method employing an n'th order spline function, continuity is required at interpolation interval boundaries for derivatives up to the n−1'st order. Akima has shown that for interpolation intervals having large valued derivatives, spline function oscillations are transmitted to neighboring interpolation intervals via derivatives, thereby reducing the interpolation accuracy. To prevent the propagation of oscillations, schemes such as the rational spline function method and Akima's interpolation method have been proposed. Akima's method determines polynomial coefficients based on local data values, and obtains good results even for sharp data variations where normal spline function methods produce oscillation. Results of numerical experiments show that accuracy is improved by using only M given data points in the local area of the point to be interpolated rather than the entire set of given data points. Further numerical experiments are necessary to determine the optimum value of M. Akima's method uses four points adjacent to interpolation interval boundaries to determine slopes at those boundaries, and finds the corresponding interpolation point value using a cubic polynomial. Hence, when the interpolation value is determined locally, oscillation propagation is suppressed, and good results are obtained.

SUMMARY OF THE INVENTION

The present invention relates to methods and apparatus for graphic display wherein at least four graphic data points are retained in memory, and the values retained in memory are arithmetically processed to determine the coordinates of a point within an interval between graphic data points. Furthermore, the present invention relates to forming two products from a set of four consecutive graphic data points by multiplying a wieghted coefficient times the difference between graphic data values at the two endpoints and their respective immediate adjacent points, averaging the graphic data values of the two adjacent central points within the set of four consecutive graphic data points, and computing the position of a point within the interval between the two adjacent central points by adding the averaged value to the two values formed by weighted coefficient multiplication.

BRIEF DESCRIPTION OF THE DRAWINGS

FIG. 3 and FIG. 4 show the effects of variation of the reciprocal of the weighted coefficient on the interpolation error in the graphics method of the present invention;

DETAILED DESCRIPTION OF THE PERFERRED EMBODIMENTS OF THE INVENTION

Figure 1:
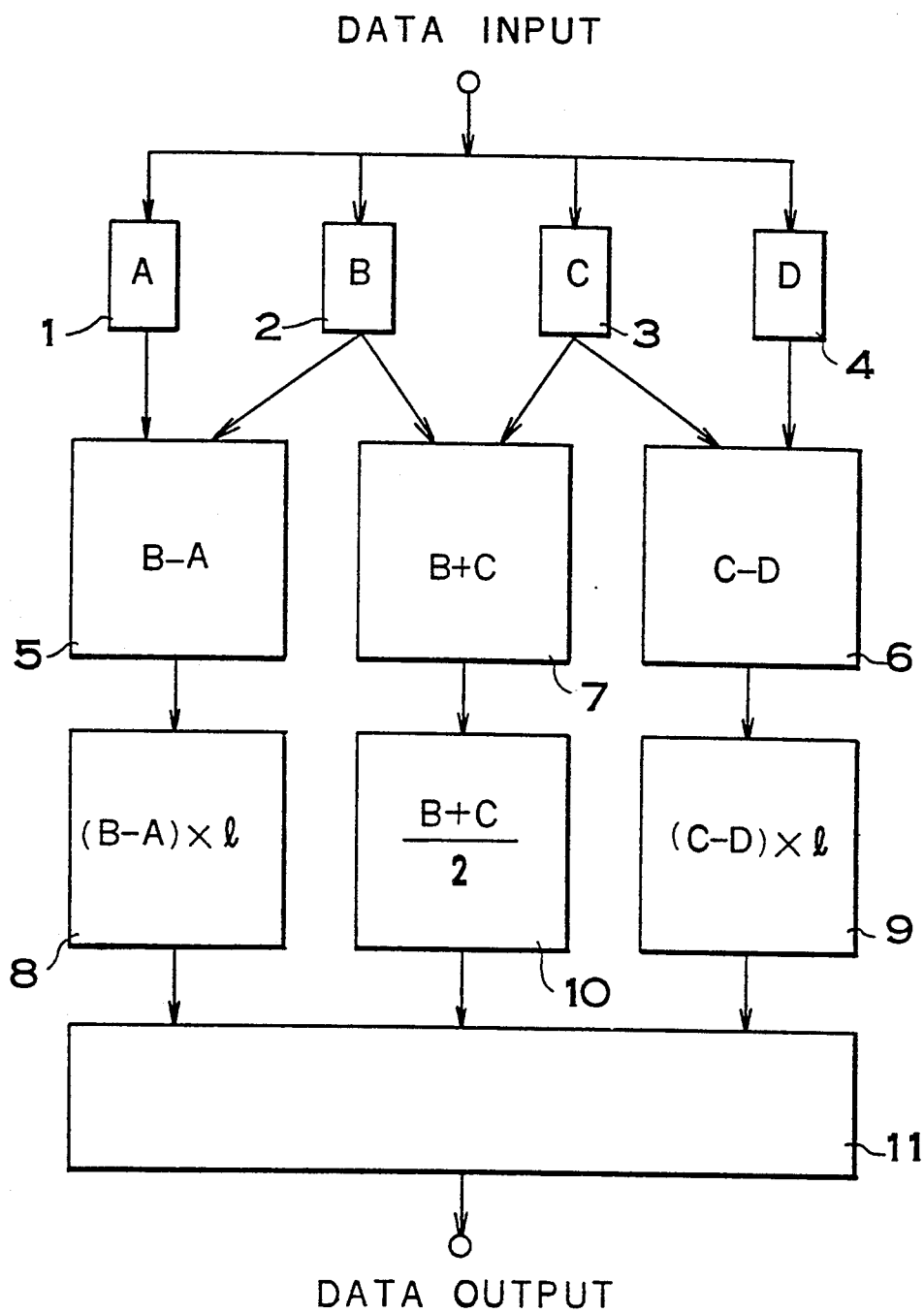
FIG. 1 is a block diagram of a preferred embodiment of the present invention.

Formerly used indirect interpolation has the shortcomings that direct determination of interpolated values is impossible, and that floating point arithmetic is required for interim calculation of the parameters $q_i$ resulting in excessive computation time. In the direct interpolation method of the present invention, the interpolated values $f(P_i)$ are directly determined from M data points in the local area of the point $P_i$ from the equation:

$$f(P_i) = F[g(X_1), \ldots, g(X_m)]$$

This results in an extreme reduction in computation time when compared with indirect methods. Given data, $g(X_i)$ and $g(X_{i+1})$, at the end points, $X_i$ and $X_{i+1}$, of the interval $delta_i$ containing the point $P_i$, are designated primary interpolation data, while data at other points are designated secondary interpolation data. For M=2 in the above equation, only the end points, $g(X_i)$ and $g(X_{i+1})$, of the interpolation interval $delta_i$ containing $P_i$, in other words only the primary interpolation data is used to find the interpolated point value. Adoption of this method to computer graphics sometimes results in the appearance of distortion in curves and curved surfaces. Generation of naturally appearing images requires accurate results obtained by effective utilization of information obtained from secondary interpolation data. However, computation time is proportional to the square of the number of given data points used for interpolation point calculation. Further, since image quality is not visually judged by considering information at distant points, interpolation based on a large number of secondary interpolation data points is unnecessary and unsuitable for high speed computation.

We define a left side correction factor, $D_L(X_i)$, determined from given data at L points [$g(X_i)$, $g(X_{i-1})$, $g(X_{i-L+1})$] to the left of, and including point $X_i$. Specifically, the left side correction factor is given by the equation:

$$D_L(X_i) = G_L(g(X_i), g(X_{i-1}), \ldots, g(X_{i-L+1}))$$

Further, we define a right side correction factor, $D_R(X_{i+1})$, determined from given data at R points [$g(X_{i+1})$, $g(X_{i+2})$, $g(X_{i+R})$] to the right of, and including point $X_{i+1}$. Specifically, the right side correction factor is given by the equation:

$$D_R(X_{i+1}) = G_R(g(X_{i+1}), g(X_{i+2}), \ldots, g(X_{i+R}))$$

As indicated by Akima, naturally appearing interpolated curves can be obtained by calculating interpolation point values from slopes determined from data in the vicinity of the interpolation interval. Consistent with the objective of high speed computation, left and right interpolation correction factors are assumed to be weighted sums of first order differences.

Limiting the given data points used for interpolation value determination to those in the same local area used by Akima, the equations for the left and right side correction factors simplify to the following:

$$D_L(X_i) = l[g(X_i) - g(X_{i-1})]$$

$$D_R(X_{i+1}) = l[g(X_{i+1}) - g(X_{i+2})]$$

Here the weighted coefficient $l$ is the same for both the left and right sides, and its value is determined empirically. Further, since integer division using binary computation reduces to bit shifting when the divisor is a power of two, computation time can be saved by assuming $l$ to be a power of two.

$$l = 1/2^N = 1/L$$

Here the value of N which minimizes interpolation error is determined by numerical experiments.

Reducing the above to one equation for the interpolated value at point $P_i$ within the interpolation interval, we have:

$$f(P_i) = [g(X_i) - g(X_{i-1}) + g(X_{i+1}) - g(X_{i+2})]/2^N + [g(X_i) + g(X_{i+1})]/2$$

Formerly used indirect interpolation methods use given data in fixed point form to calculate the intermediate parameters $q_i$ using floating point arithmetic, then generate graphics data in fixed point form for display. Since the parameters $q_i$ are numerically sensitive, fixed point arithmetic cannot be employed with sufficient accuracy to insure a visually natural graphic display. On the other hand, the graphics method of the present invention avoids the use of floating point arithmetic to generate fixed point display data from fixed point given data with an accuracy that insures a visually natural graphic display. Because of the high computation speed inherent in the graphics method of the present invention it is particularly suitable for computer graphics applications when implemented in hardware form.

The graphics method of the present invention determines interpolation values using only integer addition and bit shift operations when the reciprocal of the weighted coefficient is a power of two, and is also readily adaptable to parallel processing. It thereby amply fills the need for high speed display of computer graphics. Compared with former interpolation methods employing floating point arithmetic, processing speed increases are attainable of several hundred fold, and over a thousand fold when implemented in parallel hardware. By taking advantage of the special features of the present invention, processing speeds unattainable by former methods are possible in the following fields.

(1) Waveform Graphics Applications

Waveform graphics is the display of analog signals which have been digitized by an A/D converter and processed by, for example, a digital signal processor. Restrictions, such as A/D converter speed and memory size, set an upper limit on the sampling rate for data collection. Consequently, it is necessary to determine many interpolated points between sampled data points for the display of a rapidly varying input waveforms with sparse sampling points. Interpolation by the formerly used spline function method requires excessive calculation time, and is therefore, not adaptable to realtime (close to instantaneous) processing. Ideally, realtime display of high resolution waveforms is desirable for meaningful operator-machine communication. If the graphics method of the present invention is implemented in hardware and processed in parallel, numerous interpolation points can be quickly determined between sampling points, and high quality, high resolution waveforms can be displayed at extremely high speeds.

(2) Computer Graphics Applications

At times it is desirable to enlarge or zoom in on graphic images produced by the ray tracing method. For example, the present invention can be used for magnifying a ray traced image four fold for more detailed examination. Two repetitions of the graphics method of the present invention would determine the intermediate points of the intermediate points to display an accurate enlarged image at high speed.

Electroencephalogram, electrocardiogram, and other bioelectrical signals expressed as distributions by plotting equipotential lines are graphically displayed for medical treatment purposes. A high speed graphics technique is necessary to display these dynamically varying plots.

The graphics method of the present invention can also be used in the industrial instrumentation field to present distributions such as temperature and pressure as realtime images.

(3) CAD/CAM Applications

The graphics method of the present invention can be used to enlarge portions of a graphic image without reducing the resolution. Enlarging an image by simply enlarging the basic pixel size results in reduced image quality. The present invention can be used to determine interpolated values for high speed, high resolution image enlargement.

Complex shapes can be graphically expressed by establishing many (X, Y, Z) coordinate points with a digitizer or solid object measurement device, then smoothly joining those points by interpolating according to the method of this invention. Other applications include construction of curved surfaces by interpolating on a wire frame model established by the above method. Curved surface data thus generated can be directly used as production data for injection molding processes.

(4) Compact Disk Output Applications

Compact disk output is normally in terms of 16 bit data. The method of the present invention can be used to interpolate between sampling points prior to digital to analog conversion in order to reconstruct a high quality analog signal. Since this must be performed on a realtime basis, processing speed prohibits software implementation. Assuming the output signal to be graphics data, the graphics method of the present invention can achieve the necessary processing speed by parallel hardware implementation.

(5) XY Plotter Applications

The graphics method of the present invention can be used to construct high resolution interpolated data for numerical control of devices such as the XY plotter.

(6) Graphic and Other Types of Data Compression Applications

The graphics method of the present invention can be applied for the compression, transmission or storage, and later high speed reconstruction of graphic and other types of data. The data compression method is described in the following.

Assume a sequence of points separated by equal intervals $S = [X_1, X_2, \ldots, X_2]$, with the data at those points given by $g(X_i)$, $(i = 1, 2, \ldots, n)$. Let $R = [X_i, X_{i+m}, X_{i+2m}, \ldots, X_{i+jm}]$ represent the sparse sequence of points taken periodically every $m = 2^k$ (integer k) points from the point sequence S, where $i + jm \leq n$. The graphics method of the present invention can be applied to the sparse point sequence R to produce interpolated values $h(X_i)$, $(i = 1, 2, \ldots, n)$ corresponding to the points omitted from the sequence S. It is obvious that for points in the sequence R:

$$g(X_i) = h(x_i)$$

and for data corresponding to points in the sequence S:

$$ABS(g(X_i) - h(X_i)) < e \ (i = 1, 1, \ldots, n)$$

Satisfying this inequality means that data can be compressed and reconstructed within an error e. Storing only data for the point sequence R results in an m:1 data reduction ratio. This data compression method is characterized by an extremely short data reconstruction time and by the possibility for local data reconstruction. The method is therefore of practical value in applications such as CAD/CAM. A data reduction ratio which is a power of two makes processing especially fast and it makes the data suitable for (binary) memories and other processing such as FFT (Fast Fourier Transform).

This invention represents the development of a new method and apparatus for interpolation of graphics data which does not have the slow speed, oscillation generation, and interpolation inaccuracy shortcomings concomitant with the former, often employed, spline function method. Interpolated curves are determined based on local area data, thereby avoiding oscillation phenomena even for data containing sharp variations. The optimum value of the weighted coefficient has been determined experimentally to assure highly accurate interpolation results. Fortunately, the optimum value of the reciprocal of the weighted coefficient is such that it can be expressed as a power of two, thereby allowing extremely high speed digital processing.

The preferred embodiment of the apparatus of the present invention is described based on illustrations as follows.

The apparatus shown in FIG. 1 comprises four memory elements 1, 2, 3, and 4, a multiplying means for multiplying a weighted coefficient times the difference between the data values retained in memory elements 1 and 2, a multiplying means for multiplying a weighted coefficient times the difference between the data values retained in memory elements 3 and 4, a dividing means for averaging the data values retained in memory elements 2 and 3, and an adding means 11. Each multiplying means is provided with a subtracter 5 and 6 and a multiplier 8 and 9. The dividing means is provided with an adder 7 and a divider 10.

Four successive graphic data elements A, B, C, and D, corresponding to the memory elements 1, 2, 3, and 4 of FIG. 1, are input from the point labeled DATA INPUT. The difference (B−A) is computed by the subtracter 5 associated with graphic data elements A and B, the difference (C−D) is computed by the subtracter 6 associated with graphic data elements C and D, and the sum (B+C) is computed by the adder 7 associated with graphic data elements B and C. The subtracter 5 output (B−A) is multiplied by a weighted coefficient l in the multiplier 8, the subtracter 6 output (C−D) is multiplied by the weighted coefficient l in the multiplier 9, and adder 7 output (B+C) is divided by two in the divider 10. Finally, the multiplier 8 output, the multiplier 9 output, and the divider 10 output are added in the adding means 11 and that sum total is output at the point labeled DATA OUTPUT. For the case where the reciprocal of the above mentioned weighted coefficient is a power of two, multiplication of graphics data represented as integers in the multipliers is reduced to high speed bit shifting operations. Because of the processing speed advantage, multiplication is replaced by bit shifting in practice, and the present invention includes the case where the reciprocal of the weighted coefficient is a power of two and the multipliers execute bit shifting operations on integer graphics data.

Figure 2:
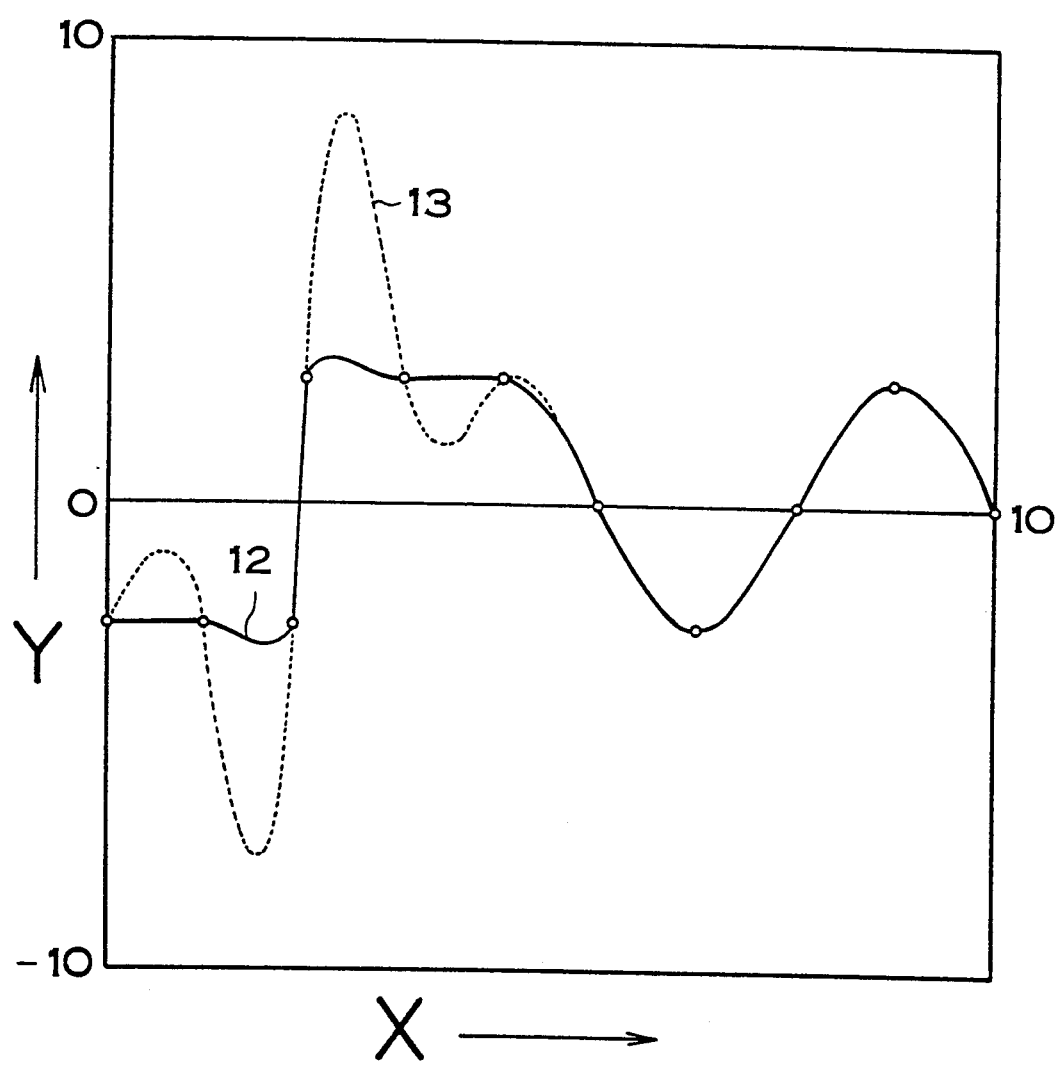
FIG. 2 shows a comparison of interpolation results using the graphics method of the present invention and the formerly used spline function method.

Turning now to FIG. 2, results obtained by applying the graphics method of the present invention 12 (thick line) are compared with results obtained by applying the formerly used spline interpolation method 13 (thin line) to the rough (low resolution) graphic data points shown as small circles. As shown by the broken line, use of the spline interpolation method results in the generation of oscillations and poor graphics, while, as shown by the solid line, use of the graphics method of the present invention shows little oscillation, good graphics results, and high speed graphics data generation is possible.

The optimum value of the reciprocal of the weighted coefficient L ($l = 1/L$) is determined experimentally by applying the graphics method of the present invention to curves expressed by various simple functions. Interpolation accuracy is evaluated by determining the difference between a given function H(x) and interpolated values obtained by applying the graphics method of the present invention to data from that given function. The interpolation error E is defined by the equation $$E = MAX [H(x_i) - f(x_i)]$$

where $x_i$ is a point within the interpolated interval, and $f(x_i)$ is the value interpolated by the graphics method of the present invention.

Since the interpolation accuracy for smoothly varying functions differs from that for sharply varying functions, interpolation accuracy is investigated assuming a given function which is a smoothly varying function joined with a sharply varying function. The error E between this given function and interpolated values is calculated, and the optimum value of the reciprocal of the weighted coefficient L is determined. Interpolated values for the function shown in FIG. 2 are determined by the graphics method of the present invention, the error E is evaluated by the above equation, and the relation between L and E is shown in FIG. 3. The interpolation error E decreases rapidly as L increases, and obtains a minimum at L=15. Considering processing speed, L=16 or N=4, where $L=2^N$, is determined to be optimum.

Figure 4:
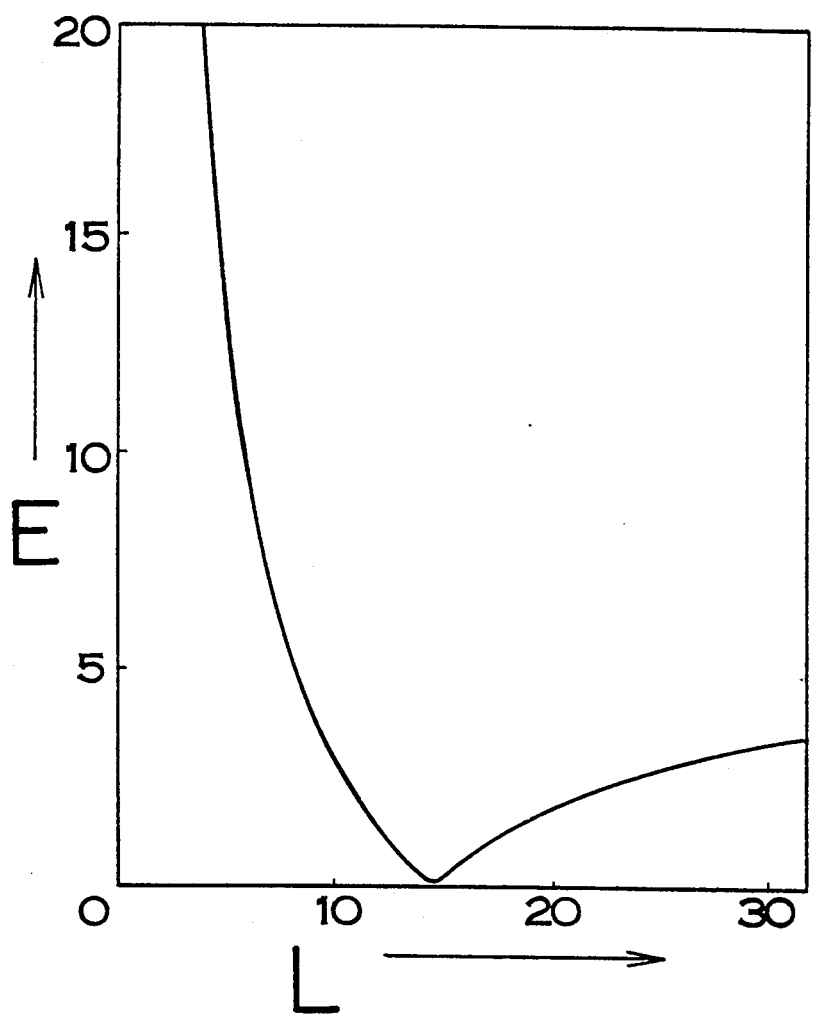

Interpolation accuracy on the circumference of a circle can be evaluated without the necessity of determining end point or boundary conditions. A circle is described in terms of parametric equations, the circumference is divided into eight equal arcs and arc end points are taken as data points. The graphics method of the present invention is applied to those data points, and the relation between the interpolation error E and L is shown in FIG. 4. Again the interpolation error E decreases rapidly as L increases, and obtains a minimum in the region of L=14. Consequently, N=4 is also an optimum value for interpolation on the circumference of a circle.

The algorithm for computing points on the circumference of a circle expressed in parametric for: using only integer valued (fixed point) arithmetic will be described next. For this case, the graphics method of the present invention is applied to both X and Y coordinates, and the method is summarized in the following.

Figure 5:
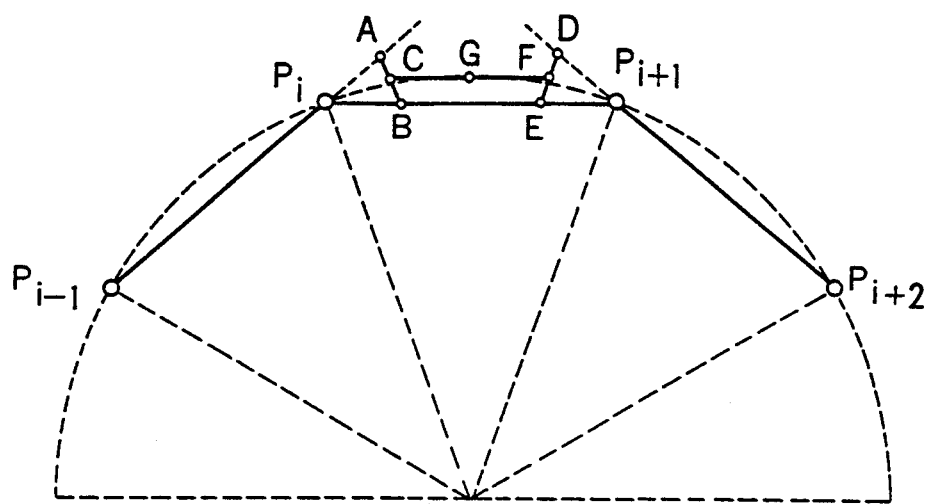
FIG. 5 is a diagram showing a geometric explanation of the application of the graphics method of the present invention on the circumference of a circle.

Turning to FIG. 5, a series of coplanar given data points $P_i(X_i,Y_i)$, (i=1,...,n) are taken along the circumference of a circle. The interpolation interval is taken to be delta $X_i=X_i, X_{i+1}]$ and delta $Y_i=[Y_i,Y_{i+1}]$, (i=1,...,n−1). An interpolation point $G_i$ in the interpolation region delta$_i$ [delta $X_i$, delta $Y_i$] is determined using the series of points $P_i(X_i,Y_i)$. If the distance from the point $G_i$ to the center of the circle is very nearly equal to the radius of the circle, that point is valid data for high resolution graphic display of the circle.

Four points $P_{i-1}(X_{i-1},Y_{i-1})$, $P_i(X_i,Y_i)$, $P_{i+1}(X_{i+1},Y_{i+1})$, and $P_{i+2}(X_{i+2},Y_{i+2})$ of the given circle data point series are shown in FIG. 5. The geometric procedure for determining an interpolation point $G_i$ in the region delta$_i$ using these four points is given by the following steps.

(1) Point A $(X_a,Y_a)$ is found on the extrapolated line segment $P_{i-1} P_i$, where the line segment A $P_i$ is one quarter the length of the line segment $P_{i-1} P_i$. Point B $(X_b,Y_b)$ is found on the line segment $P_i P_{i+1}$, where the line segment $P_i$ B is one quarter the length of the line segment $P_i P_{i+1}$. Hence $$X_1 = X_i + (X_i - X_{i-1})/4$$

$$Y_a = Y_i + (Y_i - Y_{i-1})/4$$

$$X_b = X_i + (X_{i+1} - X_i)/4$$

$$Y_b = Y_i + (Y_{i+1} - Y_i)/4$$

(2) Center point C $(X_c,Y_c)$ is found on the line segment A B, such that $$X_c = (X_a + X_b)/2$$

$$Y_c = (Y_a + Y_b)/2$$

(3) Point D $(X_d, Y_d)$ is found on the extrapolated line segment $P_{i+1} P_{i+2}$, where the line segment D $P_{i+1}$ is one quarter the length of the line segment $P_{i+1} P_{i+2}$. Point E $(X_e,Y_e)$ is found on the line segment $P_i P_{i+1}$, where the line segment $P_{i+1}$ E is one quarter the length of the line segment $P_i P_{i+1}$. Hence $$X_d = X_{i+1} - (X_{i+2} - X_{i+1})/4$$

$$Y_d = Y_{i+1} - (Y_{i+2} - Y_{i+1})/4$$

$$X_e = X_{i+1} - (X_{i+1} - X_i)/4$$

$$Y_e = Y_{i+1} - (Y_{i+1} - Y_i)/4$$

(4) Center point F $(X_f,Y_f)$ is found on the line segment A B, such that $$X_f = (X_d + X_e)/2$$

$$X_f = (Y_d + Y_e)/2$$

(5) Interpolation point G $(X_g,Y_g)$ is determined at the center of the line segment C F by $$X_g = (X_c + X_f)/2$$

$$Y_g = (Y_c + Y_f)/2$$

Figure 6:
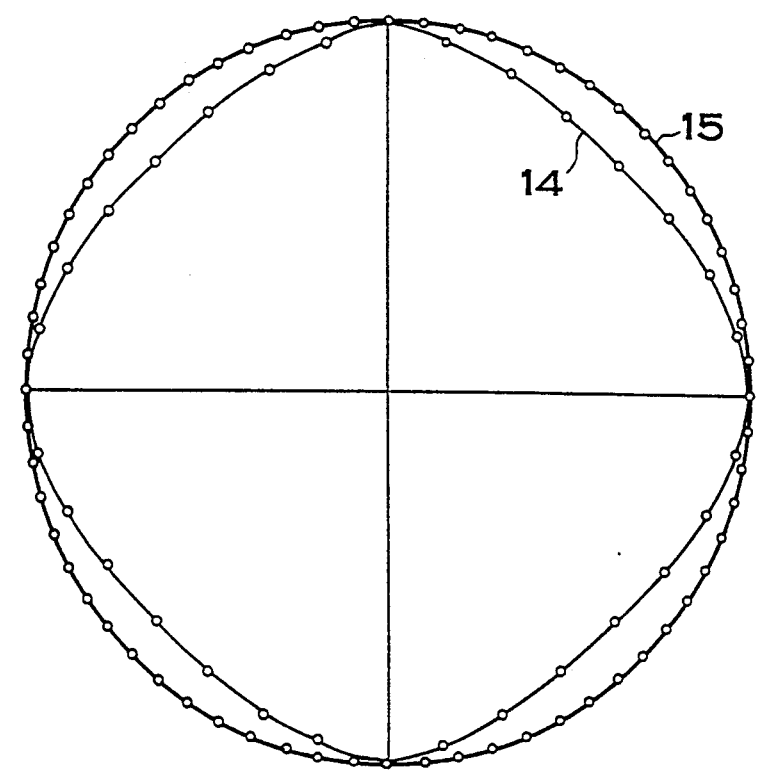
FIG. 6 shows results of the use of the graphics method of the present invention for circle generation.

By this algorithm, an intermediate point G $(X_g,Y_g)$ is generated in the interval described by four consecutive data points of given point series. If the intermediate points generated by this algorithm are then taken as data points, the interpolation intervals are halved. Therefore, repeated application of this procedure generates interpolation points of successively higher resolution. By this operation, M data points $(X_i,Y_i)$ on the circumference of a circle are obtained such that the resolution of the interpolation interval corresponds to graphic pixel resolution. FIG. 6 shows actual graphics results for given data points taken every 90°14, and for given data points taken every 45°15 on the circumference of a circle.

Since boundary conditions effect interpolation results, they must be determined nonarbitrarily. For the case of natural cubic splines, second derivatives are forced to zero at the boundaries. Naturally appearing graphics images are obtained when data variation trends are continuous across the boundaries.

The point $(X_3,Y_3)$ from the set of three consecutive points $(X_1,Y_1)$, $(X_2,Y_2)$, and $(X_3,Y_3)$ is taken as a boundary point, and a method of generating two additional points for local determination of interpolated values is presented as follows. Two virtual points $(X_4,Y_4)$ and $(X_5,Y_5)$ are assumed beyond the boundary at $(X_3,Y_3)$, and are determined by the Lagrange interpolation method. Namely, all five points from $(X_1,Y_1)$ to $(X_5,Y_5)$ are chosen to lie on the quadratic curve $$y = ax^2 + bx + c$$

and satisfy the conditions $$X_3 - X_1 = X_4 - X_2 = X_5 - X_3$$

However, employment of the Lagrange interpolation method gives rise to oscillations which become considerable at the most separated points such as $(X_5,Y_5)$. These oscillations, known as the Runge phenomenon, make it difficult to obtain reliable boundary conditions. Therefore the point $(X_5,Y_5)$ is discarded, and an intermediate point M in the interval between $(X_3,Y_3)$ and $(X_4,Y_4)$ is determined from the above equations. By using these boundary conditions with the graphics method of the present invention, intermediate point interpolated values can be determined for all interpolation intervals. New interpolation intervals are successively created by previous data points and intermediate interpolated values. The graphics method of the present invention is repeatedly applied to the new intervals to determine new intermediate point interpolated values. In this way, interpolation intervals can be made sufficiently small (sufficiently high resolution) to allow creation of a set of points representing the interpolated curve.

The graphics method of the present invention, using a reciprocal of the weighted coefficient which is a power of two, is expressed algorithmically as follows. Four integer values $X_a$, $X_b$, $X_c$, and $X_d$ are input, and one integer value $Y$ is output.

[(C programming language like) algorithm]
integer $X_a, X_b, X_c, X_d, Y$;
integer $A, B, C$;

$A = X_b - X_a;\ A >> 4$;

$B = X_c - X_d;\ B >> 4$;

$C = X_b + X_c;\ C >> 1$, where the notation $A>>4$ indicates a four bit shift towards lower order bits (shift right).

As an example, the necessary bit length for the integer variables A, B, and C, with 32 bit input and output ($X_a$, $X_b$, $X_c$, $X_d$, and all 32 bits each), is also 32 bits.

Since the graphics method of the present invention requires repeated application of a simplified algorithm, it can be realized in the form of a digital computation graphics device.

The method and apparatus for high resolution graphics described above has the following characteristics.

Since true values for data sampled or generated at given intervals is unknown at interpolated points within those intervals, it is difficult to appraise the accuracy of an interpolation method. Data taken from known functions can be interpolated and compared with actual values. When the known function is a low order and the interval between data points is small, a reasonably high degree of accuracy can be obtained by linear interpolation. However, for meaningful accuracy appraisal, data from given functions of a high order should also be used. The value of the reciprocal of the weighted coefficient L which minimizes interpolation error for the graphics method of the present invention was determined considering a synthesis of functions of both a high and low order. Akima has also provided data comprising a smoothly varying portion and a sharply varying portion. When the data of Akima is interpolated by the cubic spline method, the Runge phenomenon occurs producing overshoot oscillations making high accuracy graphics display difficult. Curved lines with sharp variations also appear in CAD/CAM applications, and spline function interpolation in these cases requires employment of higher order functions to attain sufficient accuracy. Although it is mathematically simple to impose the required continuity conditions for higher order derivatives along the interpolated spline curve, these operations require excessive computation time.

Computer graphics data must be generated corresponding to each pixel of the display system (including hardcopy systems), and an objective of any computer graphics method is to produce visually smooth images. To avoid interpolated point sets that appear unnatural when displayed, it is necessary to compare interpolated point sets with smooth curves. Point sets generated by the graphics method of the present invention have been applied to data on curves with continuous higher order derivatives, and errors between the original curves and the interpolated points have been evaluated confirming the accuracy of the graphics method of the present invention.

Computer graphics data is normally stored in memory corresponding to respective pixels of the display device, and read out successively to display the stored image. Information stored in the display memory is normally considered to be integer in an interger and to have from 8 to 32 bits. Computer graphics interpolation methods use integer data on a widely spaced grid to calculate integer data on a finely spaced grid. Consequently, the process of computing high resolution graphics data can be be accomplished using integer values exclusively. Since the computation of integer data is extremely fast compared with the computation of floating point data, it is desirable to avoid the use of floating point data.

As is clearly shown by the above described algorithm for the graphics method of the present invention using a reciprocal of the weighted coefficient which is a power of two, computations involve only addition, subtraction and division by a power of two. For graphics data in integer form, division by a power of two reduces to bit shifting. Consequently, since computation can be performed simply by addition (subtraction being addition of negative numbers) and bit shifting, high speed processing is possible. Further, since interpolated values are determined from local data points, parallel processing can be invoked to realize greater computation speed. In particular, the graphics method of the present invention is adaptable to devices such as "graphics processors" which can perform parallel computations during block memory moves.

In the application of the formerly used spline function interpolation method, it is necessary to solve coefficient equations which are equal in number to the number of data points employed. The number of computations required increases as the square of the number of data points, and the number of especially time consuming multiplications increases as the number of data points increases. As a result when the amount of data becomes large, interpolation using spline functions becomes extremely time consuming and is thereby inadequate as a high speed interpolation method.

Since the graphics method of the present invention determines interpolated values locally, there is no rapid increase in processing time as the amount of data becomes large.

Actual computation time has been evaluated experimentally as follows. Using the C programming language and a 16 bit computer, computation by the formerly and widely used cubic spline interpolation method required 65 msec for each interpolated point. Computation of the same data by the graphics method of the present invention with the weighted coefficient equal to 1/16 and using 16 bit integer arithmetic required 0.2 msec, thereby achieving a 300 fold increase in processing speed. The large difference in computation time is a result of the employment of floating point arithmetic for interpolation by the formerly used spline function method as opposed to the exclusive use of integer (fixed point) arithmetic to obtain sufficient interpolation accuracy by the graphics method of the present invention. Furthermore, since the algorithm corresponding to the graphics method of the present invention (direct interpolation) is adaptable to parallel processing, higher processing speeds are possible by incorporating parallelism in the computation method. Hardware implementation of interpolation computations using spline functions is extremely complicated and at least impractical. On the other hand, since the algorithm corresponding to the graphics method of the present invention, using a reciprocal of the weighted coefficient which is a power of two, can be performed by only addition and bit shifting, hardware implementation is simple. It can therefore be concluded that a very high speed interpolation system can be developed by a parallel processing hardware implementation of the graphics method of the present invention.

When given data is spaced at even intervals (periodic data), the algorithm corresponding to the graphics method of the present invention is simple, and sufficient interpolation accuracy can be obtained by exclusive use of integer arithmetic. Further, as a result of experimentation with various graphics data, it has been determined that even data which is not exactly evenly spaced, in other words semi-periodic data, can be interpolated by integer arithmetic with negligible effect on interpolation accuracy. This is because of the large degree of tolerance associated with the reciprocal of the weighted coefficient L. Good interpolation accuracy is obtained for values of L between 10 and 20 regardless of slight nonuniformity in data spacing.

The formerly used cubic spline method and the graphics method of the present invention are compared in the following. When an interpolated curve is represented by cubic spline functions, continuity up to second derivatives is locally satisfied. However, there is no one to one relation between continuity for derivatives and high quality graphics. Consideration of continuity in changes from pixel to pixel is required for smooth naturally appearing graphics images. In the actual application of cubic spline functions to curved surfaces having large rates of change, oscillations are generated, and large regional distortions may appear in the graphic display.

Calculation only of interpolation points which correspond to individual pixels is the most suitable approach for high speed graphic display. In computer graphics, there is a one to one correspondence between display memory and display pixels, and it is necessary and sufficient to directly generate only data corresponding to individual pixels (pixel data). From this point of view, the formerly used spline function interpolation is seen to be an indirect method. In the spline function method, spline function coefficients are determined based on continuity for higher order derivatives at nodal points. Pixel data is then generated by including pixel position information in the previously established spline function. In actuality, once the spline function coefficients have been determined, pixel data corresponding to infinitely small pixels (a continuous system) can be generated. Since it is sufficient only to generate pixel data for a discrete system, more than sufficient intermediate calculations are performed. This is equivalent to solving for an unnecessary quantity of data. On the other hand, high speed graphic display can be achieved by simplifying calculations such that only interpolation point data corresponding to individual pixels is solved directly.

Furthermore, the use of floating point arithmetic to mathematically satisfy continuity conditions for higher order derivatives is unavoidable. Although the use of a floating point coprocessor is a possibility, floating point processing time is in any case extensively greater than fixed point processing time. In addition, for high accuracy interpolation, floating point bit length must be sufficient to avoid lost decimal places.

What is claimed is:

1. In a computer controlled display device in which an interpolated graphic display image is formed automatically by determining locations of interstitial graphic display pixels of the display device located between a plurality of given graphic display pixels of the display device and then combining the interstitial graphic display pixels and the given graphic display pixels to display the interpolated graphic display image, the improvement comprising:

a memory having graphic point data stored therein, said graphic point data denoting display information for said plurality of given display pixels of said display device;

a hardware implemented parallel processing circuit, coupled to said memory, having hardware configured to receive first, second, third and fourth graphic point data from said memory, said first, second, third and fourth graphic point data respectively denoting first, second, third and fourth display pixel locations of said display device, to conduct a first bit-shifting operation to obtain a first 4-bit-shifted difference of said first graphic point data from said second graphic point data, to conduct a second bit shift operation to obtain a second 4-bit-shifted difference of said fourth graphic point data from said third graphic point data, to conduct a third bit-shifting operation to obtain a one-bit-shifted summation of said second graphic point data and said third graphic point data, and to conduct a summation of said first 4-bit-shifted difference and said second 4-bit-shifted difference and said one-bit-shifted summation to obtain interstitial graphic point data, said interstitial graphic point data denoting an interstitial display pixel of said display device located in an interval between said second and third display pixels.

2. In a computer controlled display device as recited in claim 1, wherein hardware implemented parallel processing circuit is configured to effect said first, second and third bit-shifting operations in parallel.

3. In a computer controlled printer in which an interpolated graphic printed image is formed automatically by determining locations of interstitial graphic print pixels of the printed image located between a plurality of given graphic print pixels of the printed image and then combining the interstitial graphic display pixels and the given graphic display pixels to print the interpolated graphic printed image, the improvement comprising:

a memory having graphic pixel data stored therein, said graphic pixel data denoting print information for said plurality of given print pixels of said printed image;

a hardware implemented parallel processing circuit, coupled to said memory, having hardware configured to receive first, second, third and fourth graphic point data from said memory, said first, second, third and fourth graphic point data respectively denoting first, second, third and fourth print pixel locations of said printed image, to conduct a first bit-shifting operation to obtain a first 4-bit-shifted difference of said first graphic point data from said second graphic point data, to conduct a second bit shift operation to obtain a second 4-bit-shifted difference of said fourth graphic point data from said third graphic point data, to conduct a third bit-shifting operation to obtain a one-bit-shifted summation of said second graphic point data and said third graphic point data, and to conduct a summation of said first 4-bit-shifted difference and said second 4-bit-shifted difference and said one-bit-shifted summation to obtain interstitial graphic point data, said interstitial graphic point data denoting an interstitial print pixel of said printed image located in an interval between said second and third print pixels.

4. In a computer controlled display device as recited in claim 3, wherein hardware implemented parallel processing circuit is configured to effect said first, second and third bit-shifting operations in parallel.

* * * * *